Sept. 7, 1965 G. L. RICHARDS 3,205,447

PULSE DETECTOR

Filed Sept. 18, 1962

INVENTOR.
GLENN L. RICHARDS
BY
Robert L. Nathans
ATTORNEY 3,205,447

PULSE DETECTOR

Glenn L. Richards, Webster, N.Y., assignor to General Dynamics Corporation, Rochester, N.Y., a corporation of Delaware Filed Sept. 18, 1962, Ser. No. 224,416
3 Claims. (Cl. 328—195)

The present invention relates to pulse train detectors.

In modern high-speed electronic switching systems, or data processors, it is often necessary to produce a first or second output signal depending upon whether or not a pulse train is present or absent at a given point. In prior art high-speed pulse train detectors, a first voltage level is produced during the presence of a pulse train and a second voltage level is produced upon the cessation of a pulse train. Voltage fluctuations in each of these voltage levels are caused by the introduction of spurious signals owing to the effect of resetting pulses continually applied to the detectors by a clock pulse source.

Accordingly, it is the principal object of the present invention to provide a new and improved high-speed pulse train detector which produces a first steady and unwavering voltage level upon the application of a pulse train to the detector and which produces a second steady and unwavering voltage level upon the cessation of the pulse train.

It is a further object of the present invention to provide a pulse train detector which produces a change in output voltage upon the detection of a pulse train, which change is coincident with the application of a clock pulse.

Further objects and advantages of the invention will become apparent as the following description proceeds, and the features of novelty which characterize the invention will be pointed out with particularity in the claims annexed to and forming a part of this specification.

Figure 1:
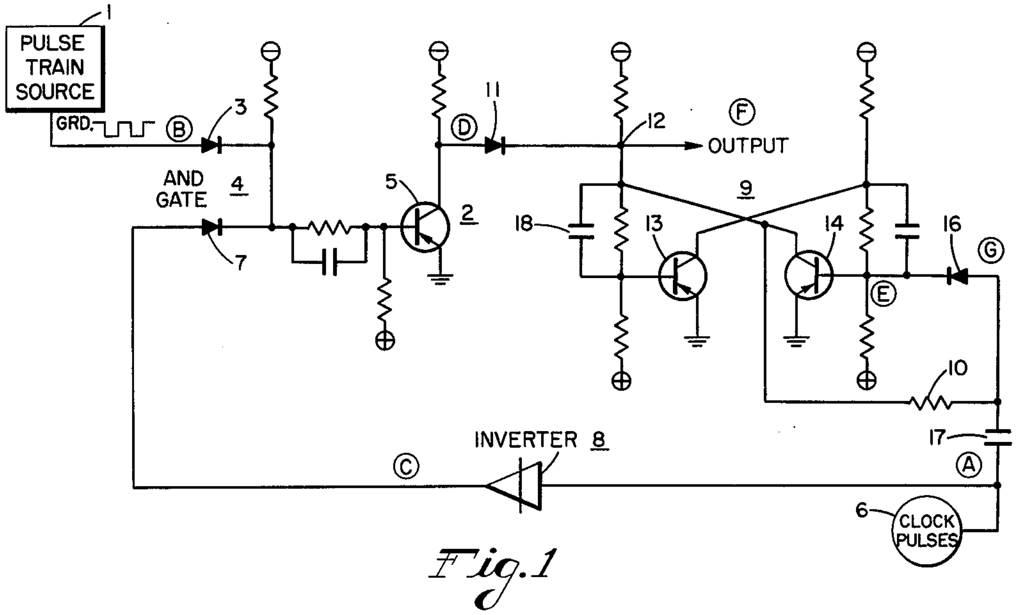

For a better understanding of the invention, reference may be had to the accompanying drawings in which:

FIG. 1 discloses a preferred embodiment of the present invention; and

Figure 2:
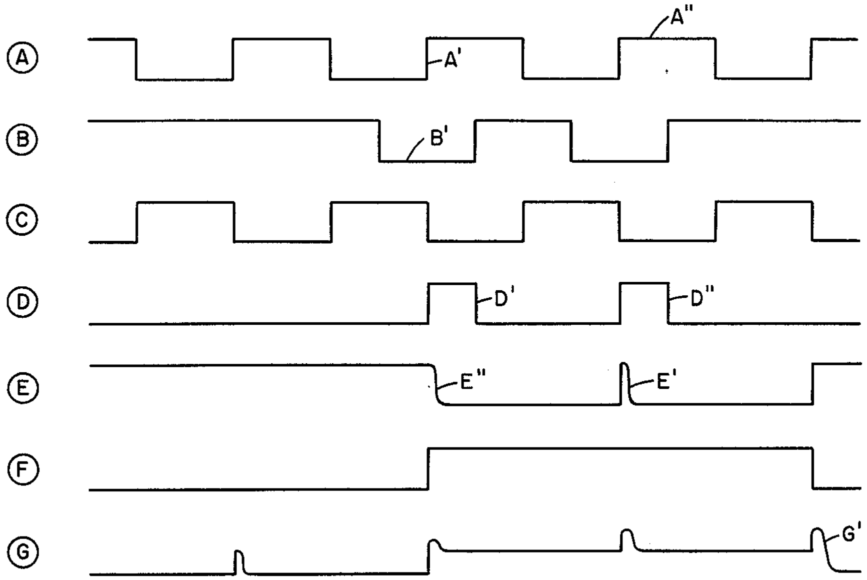

FIG. 2 discloses a pulse diagram which will aid in the understanding of the operation of the circuitry of FIG. 1.

In accordance with the present invention, a flip-flop having a setting circuit, a resetting circuit, and an output circuit is provided together with a clock pulse source for continually producing pulses which are applied to the resetting circuit through a gate, which gate is enabled only when the flip-flop assumes the set condition. This feature prevents the possible spurious setting of the flip-flop by the reset pulses continually produced by the clock and eliminates the possibility of a spurious voltage change in the output circuit of the detector when a pulse train is not being applied to the setting circuit. However, when the flip-flop is set upon the application of a pulse train, the gate is enabled so that the clock pulses can reset the flip-flop upon the cessation of the train. Although the clock pulses tend to reset the flip-flop even when an uninterrupted train is applied to the detector, the application of the train to the setting circuit causes the output circuit of the conducting control element to be clamped to ground so that the base of the non-conducting control element cannot assume a negative potential to cause resetting. Since the output circuit of the detector is connected to the clamp, the output voltage level is inaffected by the clock pulses as long as the train is applied to the setting circuit of the flip-flop.

Referring now to FIGURE 1, a pulse train source 1 is coupled to the input circuit of amplifier 2 through diode 3, which is part of AND gate 4. Clock pulse source

6 is shown coupled to diode 7 of AND gate 4 through inverter 8. The output circuit of amplifier 2 is coupled to flip-flop 9 through clamping diode 11. In the absence of pulses which make up the pulse trains to be detected, point B is at ground potential. The clock pulses are considered negative-going, as shown at A in FIGURE 2. In view of the action of inverter 8, pulses, as shown in C of FIGURE 2, will be applied to the anode of diode 7.

Let it be assumed that there are no input pulses applied at point B, i.e., point B is continually at ground potential. Under these circumstances, transistor 5 is in a state of nonconduction since a negative potential must be applied to its base to render it conductive. The output terminal of AND gate 4 cannot go negative in the absence of an input pulse. Accordingly, output terminal 12 is negative with respect to ground and transistor 13 of flip-flop 9 is biased to conduction which, in turn, causes a positive potential to be maintained at the base of transistor 14 to hold transistor 14 in a state of non-conduction. Under this condition, gating diode 16 is back biased since the base of transistor 14 is positive owing to the conduction of transistor 13.

Now let it be assumed that the first impulse B′ of a pulse train is present at B. As soon as the voltage level at C goes negative, both diodes 3 and 7 are rendered non-conductive and AND gate 4 produces a negative potential which causes transistor 5 to conduct to cause point D to go to ground potential. Upon cessation of the negative-going impulse B′, transistor 5 is again rendered non-conductive and the potential at D again assumes a negative value. Accordingly, an impulse D′ is produced by amplifier 2 and is utilized to render transistor 13 non-conductive and transistor 14 conductive by virtue of the regenerative action of flip-flop 9. The flip-flop is now set. The application of a second input pulse to the anode of diode 3 causes pulse D″ to be produced at point D. This impulse has no effect on the output signal at point 12 since point 12 is at ground owing to the conductive state of the transistor 14. It should be noted that clock pulse A″, which is differentiated by capacitor 17 to form a positive-going spike E′, tends to render transistor 14 non-conductive. This, however, has no effect on the output voltage level at F because this point is clamped to ground since the voltage applied to the anode of clamping diode 11 is at ground potential. Accordingly, no negative signal is transmitted through capacitor 18 to the base of transistor 13 to trigger it, and point F remains at ground potential. It should be noted that the pulse D″ must have a width greater than the width of trigger pulse E″ applied to the base of transistor 14 through diode 16 and capacitor 17. Accordingly, as long as an uninterrupted pulse train is applied to the anode of diode 3 at point B, transistor 14 will remain in a state of conduction and transistor 13 will be non-conductive, thereby to maintain a steady ground potential on output terminal 12.

Now let it be assumed that the pulse train at B becomes interrupted. Under this condition, AND gate 4 does not cause a negative potential to be applied to the control circuit of amplifier 2. Accordingly, point D is held at a negative potential. The next positive-going clock pulse spike G′ will pass through diode 16, which is no longer back biased, to cause transistor 14 to be rendered non-conductive which, in turn, causes point 12 to go negative with respect to ground so as to indicate an interruption in the pulse train at the output terminal. If no interruption occurred, point 12 would be clamped to ground by diode 11. This action also causes transistor 13 to become conductive since the base of transistor 13 goes negative. As long as a pulse train is absent at B, the clock pulses produced by source 6 have no effect since gating diode 16 is back biased. When a negative going impuse, such as B', is again applied at B, the flip-flop is triggered as explained hereinbefore.

In summary, when an input pulse is applied to the input circuit, the voltage level at output terminal 12 goes from a negative potential to a ground potential coincident with the trailing edge A' of the clock pulse produced by clock pulse source 6. This voltage level remains at ground as long as input pulses are applied at B. Upon the cessation of the impulse train applied at B, the ground going trigger pulses, such as E' and E'', are effective to reset flip-flop 9 so that the potential at output terminal 12 again becomes negative and remains negative until a new pulse is again applied by source 1.

While there has been disclosed what is at present considered to be the preferred embodiment of the invention, other modifications will readily occur to those skilled in the art. It is not, therefore, desired that the invention be limited to the specific arrangement shown and described, and it is intended in the appended claims to cover all such modifications as fall within the true spirit and scope of the invention.

What is claimed is:

1. In combination, (a) a flip-flop having a setting circuit and a resetting circuit, (b) means for applying set pulses from time to time to the setting circuit of said flip-flop, (c) means for continually applying reset pulses to the reset circuit of said flip-flop only when said flip-flop is set and in synchronism with said set pulses, and (d) means for making the said reset pulses effective to reset said flip-flop only when said set pulses are not concurrently applied to said set circuit.

2. A pulse train detector comprising, (a) a flip-flop having a set and reset condition and including a first and second control element, (b) each element having a control circuit and an output circuit, (c) the output circuit of each element being cross-coupled to the control circuit of the other element, (d) means for continuously applying reset pulses to said flip-flop only when said flip-flop is in the set condition, (e) means for applying set pulses to said flip-flop from time to time in synchronism with said reset pulses, and (f) clamping means coupled to the control circuit of said first control element for preventing a transitory non-conductive state induced within said second control element due to the application of said reset pulses from affecting the voltage in the control circuit of said first control element when a set pulse is applied to said flip-flop.

3. The combination as set forth in claim 2 wherein said clamping means is connected to the output circuit of said second control element.

References Cited by the Examiner

UNITED STATES PATENTS

| | | | |
|---|---|---|---|
| 2,876,348 | 3/59 | Selmer | 328—195 |
| 2,880,317 | 3/59 | Vaughn | 328—195 |
| 2,964,653 | 12/60 | Cagle et al. | 307—88.5 |
| 3,083,304 | 3/63 | Spriestersbach et al. | 307—88.5 |

ARTHUR GAUSS, *Primary Examiner.*

GEORGE N. WESTBY, *Examiner.*